INVENTOR,
JOHN BROOCKS DALTON
BY Watson, Cole, Grindle & Watson
ATTORNEYS

United States Patent Office 3,567,251
Patented Mar. 2, 1971

3,567,251
EQUALIZING TRAILER HITCH
John Broocks Dalton, Warsaw, Ind., assignor to Big Boy Products, Inc., Winona Lake, Ind.
Filed May 13, 1969, Ser. No. 824,167
Int. Cl. B62d 53/00
U.S. Cl. 280—406
6 Claims

ABSTRACT OF THE DISCLOSURE

A trailer hitch coupling usable with equalizing bars pivotally mounted therein, the coupling having wedge means therein for both maintaining the bars securely within the coupling and for accommodating different sizes of equalizing bars.

---

This invention relates generally to trailer hitches for motor vehicles and more particularly to a trailer hitch coupling usable with a pair of equalizing bars and capable of securely maintaining different sizes of such bars within the coupling.

Currently in use are a number of trailer hitches for connection to the frame or rear axle of the motor vehicle so as to transmit the load directly thereto and thus permit the automobile body to oscillate on its springs. With these type hitches, attachment is made to the trailer through a ball-and-socket joint and, in addition, by a second connection which may use shock dissipating springs. A pair of lift levers or equalizing bars are attached to the hitch coupling and are flexibly connected to the trailer frame so that the transmitted load does not result in twisting of the vehicle body frame when the vehicle and trailer are in motion. The mounted ends of each lift lever are made to contact an upper lift surface and a lower reaction surface, designed as part of the coupling, in order for the levers to perform, as intended, in transmitting the trailer load to the motor vehicle.

However, with different trailer loads it is often desirable and necessary that different sized equalizing bars be used, that is, larger bars for heavier loads and smaller bars for lighter loads. In order to make provision for the various trailer loads with existing hitches it was often necessary to replace the entire hitch so that a larger or smaller pair of equalizing bars could be used. Alternatively, a hitch with a large enough opening would be provided for the insertion of the larger sized equalizing bars thereby using the basic hitch coupling for both large and smaller bars. This approach also proved unsatisfactory because of an undue amount of play during use of the smaller equalizing bars.

In order to avoid these problems in adequately providing for different sized equalizing bars, a coupling head has been herein devised for maintaining different sized bars securely in place without the need for substitution of different coupling members or the need for an oversized coupling. Such involves the main object of this invention.

Another object of the instant design is to provide a trailer hitch coupling usable with equalizing bars pivotally mounted therein, the coupling having wedge members with upstanding means thereon for pivotally connecting each bar to the coupling, the wedge members also serving to accommodate different sizes of equalizing bars.

A further object of the invention is to provide a trailer hitch coupling of the type described wherein the sloping surface of each wedge is movable along a like sloping surface of the coupling so as to tightly secure each bar within the opening of the coupling.

A still further object of this design is to provide a trailer hitch coupling as characterized wherein the reaction surface for each bar is vertically adjustable toward the lift surface of the coupling by means of an adjustable wedge member, the top surface of which serves as the reaction surface.

Other objects, advantages, and novel features of the invention will become apparent from the following detailed description of the invention when considered in conjunction with the accompanying drawings wherein.

Figure 1:
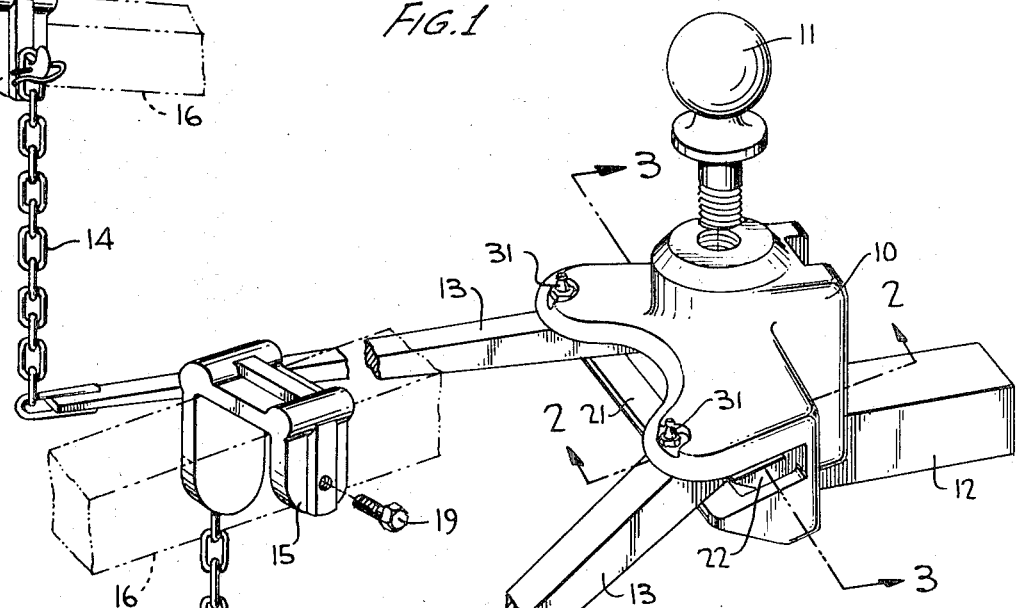
FIG. 1 is a prospective view of the trailer hitch showing the coupling in accordance with the instant invention usable with a pair of equalizing bars.
Figure 3:
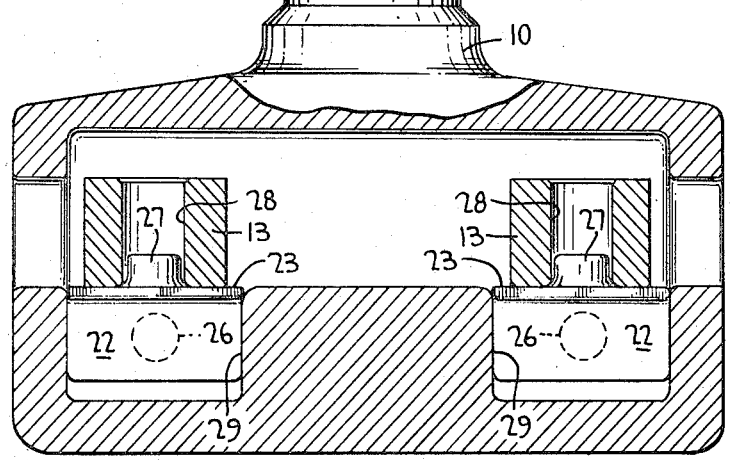
FIG. 3 is a sectional view taken along the line 3—3 of FIG. 1.

Referring now to the drawings wherein like reference characters refer to like and corresponding parts throughout the several views there is shown a trailer hitch comprising a coupling member 10 having a conventional ball member 11 thereon, shown disassembled from the coupling in FIG. 1 but normally threadedly engaged with the coupling as shown in FIG. 3. The ball member 11, of course, receives the socket end (not shown) of the trailer frame bar in the normal manner. The coupling is provided with an extension 12 which serves as an attachment for a draw bar which may be secured either to the rear axle of the motor vehicle or to the frame of the hauling vehicle. Such type of attachment forms no part of this invention and therefore will not be described in any detail. At the rearward side of the coupling 10 a pair of equalizing bars 13 are provided which are each pivotally connected to the coupling at one end and are each provided at their other ends with a chain 14 for connection, by means of a clamp 15, to respective frame members 16 of the trailer.

Figure 2:
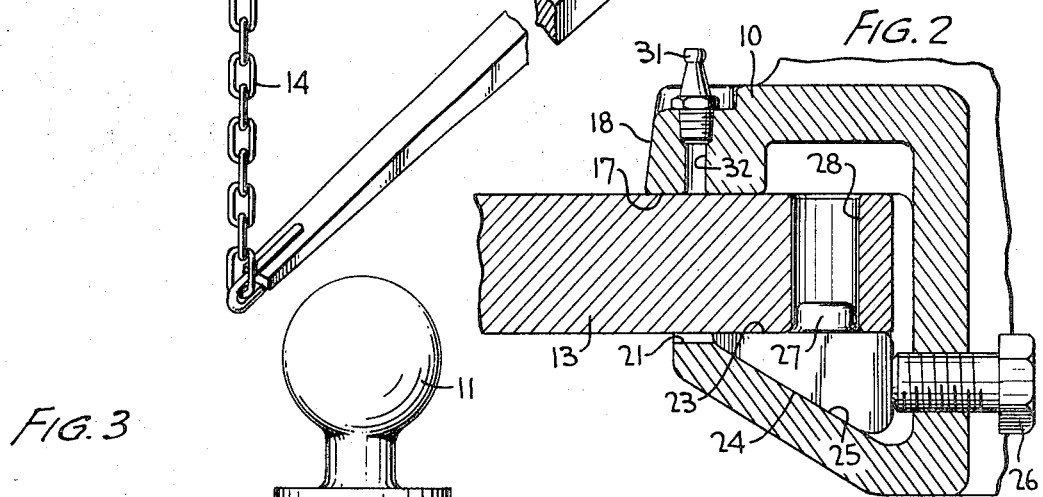
FIG. 2 is a sectional view taken along the line 2—2 of FIG. 1.

With specific reference to FIG. 2 of the drawings, it can be seen that the equalizing bars 13 are secured to the coupling 10 in a manner whereby the top surface of each bar contacts a lift surface 17 of the coupling defined by the lower surface of a depending skirt portion 18. Although FIG. 2 has been taken as a section through one of the bars 13 at one side of the coupling, it should be noted that it also represents a like section taken through the other equalizing bar at the far side of the coupling.

So far, the above-described trailer hitch is constructed and is intended to operate in a similar manner according to the currently constructed trailer hitches which make use of such equalizing bars. For example, the socket of the trailer (not shown) is placed in engagement with the ball member 11 of the trailer hitch in the normal manner and the clamps 15 are secured to the respective frame members 16 of the trailer by means of bolts 19 while the front portion of the trailer is maintained in a horizontal position as by means of a trailer jack. When the jack is lowered, the front end of the trailer will depress the coupling 10 resulting in the chains 14 becoming slightly tensioned since the trailer in the vicinity of these chains will be at a slightly higher elevation as compared to the socket end of the trailer. Accordingly, a slight lifting action will occur between the bars 13 and the coupling as the bars 13 lift up on each of the surfaces 17. Transmission of the load is therefore accomplished without twisting or other undesirable interaction with the body frame when the motor vehicle and trailer are in motion. It should also be noted that, if desired, a compression spring may be provided for each of the chains 14 so as to dissipate shock during hauling of the trailer.

Returning to FIG. 2 of the drawings, it can be seen that the lower surface of each bar 13 does not contact the upper surface 21 of the transverse opening in the coupling. Instead, the bars 13 each rest directly on a wedge member 22 each having an upper horizontal surface 23, which serves as a reaction surface for each bar, and a surface 24 which slopes upwardly toward the upper surface 21 of the transverse opening in the coupling. This sloping wedge surface cooperates with a like sloping surface 25 of the coupling for movement therealong. An adjustment bolt 26 provided in the front wall of the coupling serves to move each wedge member toward surface 21 and, by reason of sloping surfaces 24 and 25, upwardly toward lift surface 17. The opening in the coupling between surfaces 17 and 21 is designed sufficiently large to accommodate entry of various sizes of equalizing bars so that, in each case, the lower surface of the bars 13 may be maintained within the coupling slightly above the upper surface 21, as shown. By adjusting the threaded bolts 26 inwardly or outwardly of the coupling 10, it can be seen that the equalizing bar, within reasonable limitations of size, will be forced into contact with the lift surface 17 as each of the wedges 22 moves along its respective sloping surface 25. The upper surface 23 of the wedge is provided with an upstanding stud 27 which cooperates with a suitably provided aperture 28 in each of the bars 13. Accordingly, the bars 13 may be pivoted on the studs 27 during any sideways movement of the trailer.

In FIG. 3, it can be seen that each of the wedge members 22 are constrained within a well 29 of the coupling so as to limit any transverse movement of these members. Also, a grease fitting has been provided (see FIG. 2) for the admission of a quantity of grease or other lubricant through a suitably provided aperture 32 in the skirt portion 18 of the coupling directly above each of the bars 13 so as to reduce wear and increase the usable life of the hitch coupling for extended periods of use.

From the foregoing, it can be seen that a hitch coupling has been devised which not only serves to conveniently accommodate the different sizes of equalizing bars when the need arises to utilize smaller or larger bars for the size of the load involved, but the type of coupling so devised also serves to securely maintain the different sized equalizing bars within the coupling in a manner which is easy to operate, economical to manufacture and simple in its design, by simply providing a pair of adjustable wedge members. These wedge members, in addition to providing pivot points and a tight joint at the end of each bar 13, also provide a vertically adjustable reaction surface for each of the bars. As compared to other trailer hitch couplings of like design, the wedge members of the instant design may be easily replaced after any significant wear without having to replace the entire coupling. Also, a grease fitting, unlike most designs, is provided for the protection of surface wear between the top of bars 13 and the skirt portion 18. This, of course, will additionally serve to increase the service life of each coupling.

Obviously many modifications and variations of the present invention are possible in the light of the above teachings. It is, therefore, to be understood that within the scope of the appended claims the invention may be practiced otherwise than as specifically described.

What is claimed is:

1. A trailer hitch coupling usable with a pair of equalizing bars pivotally mounted therein, the coupling comprising a body, a coupling ball member mounted on said body, said body having an opening therein for reception of the end of each said bar, a lift surface defined by an upper surface of said body opening, and a movable means having a reaction surface defined by an upper surface of said movable means underlying each said bar, said movable means being vertically adjustable whereby said reaction surface for each said bar may be adjusted to thereby enable bars of various sizes to be securely maintained with said coupling, said body being defined by a lower wall means for said removable means, said wall means sloping upwardly toward said body opening, and said movable means cooperating with said wall means for vertically raising and lowering said movable means.

2. The coupling according to claim 1 wherein said lower wall means comprises a transversely extending, upwardly sloping lower wall interrupted therealong by a vertical wall and having a side wall at each end of said lower wall thereby forming a pair of upwardly sloping walls for said movable means.

3. The coupling according to claim 2 wherein said movable means comprises a wedge member for each said bar, each said wedge member having a sloping surface, and each said wedge member lying within each said well, said movable means further comprising a means for moving said wedge members along each of said sloping lower walls thereby moving said wedge members toward and away from said lift surface.

4. The coupling according to claim 3 wherein each of said wedge members has vertical pivot means thereon for cooperation with the ends of each said bar thereby securely maintaining each said bar within said coupling.

5. The coupling according to claim 4 wherein said wedge moving means comprises an adjustment bolt in engagement with the vertical face of each said wedge member.

6. The coupling according to claim 5 further comprising a grease fitting means provided on said body for lubrication of each said end of said bars.

References Cited

UNITED STATES PATENTS 3,347,561 10/1967 Hedgepeth _____ 280—406.1
2,793,879 5/1957 Bair _____ 280—406.1

LEO FRIAGLIA, Primary Examiner